Figure 1:
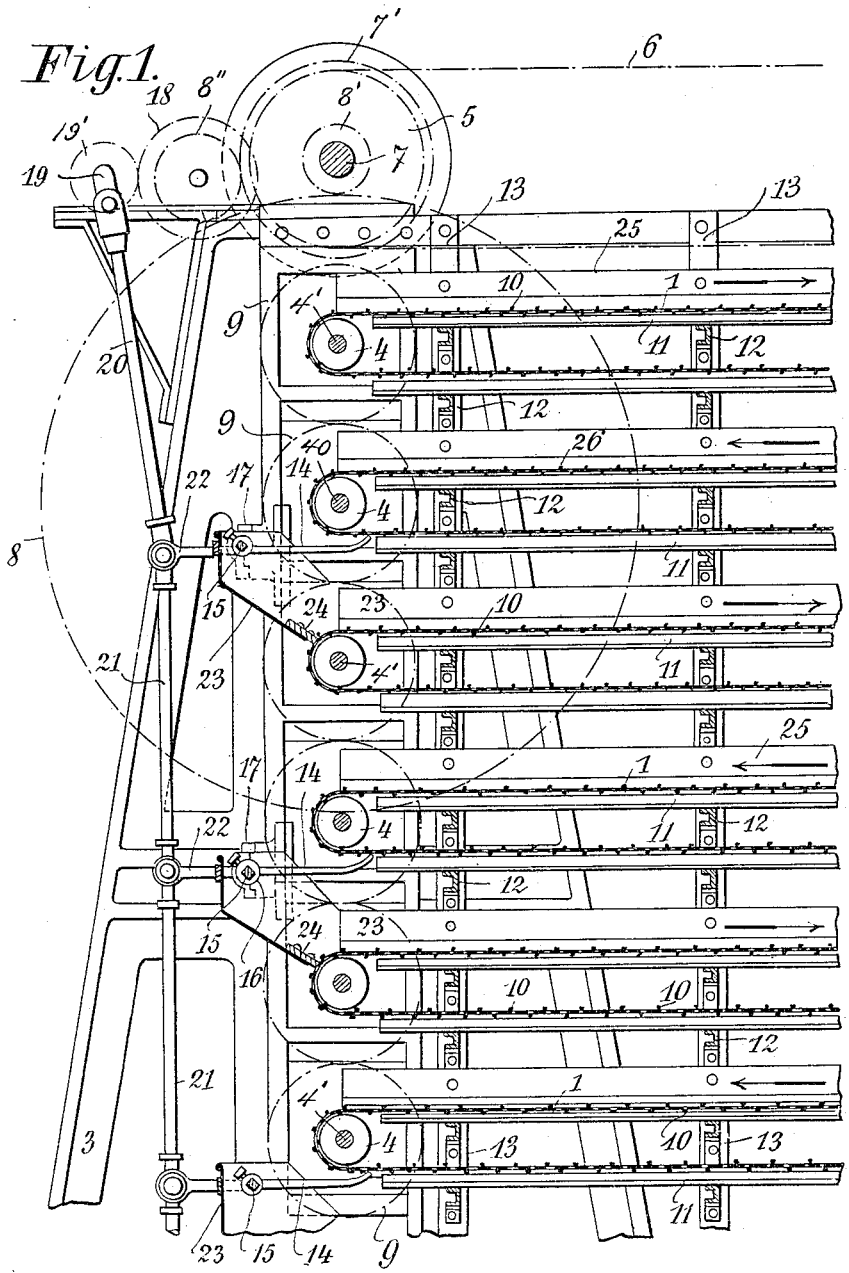

No. 825,242. PATENTED JULY 3, 1906.
R. PLISCHKE.
MALT GERMINATING APPARATUS.
APPLICATION FILED AUG. 15, 1904.

3 SHEETS—SHEET 1.

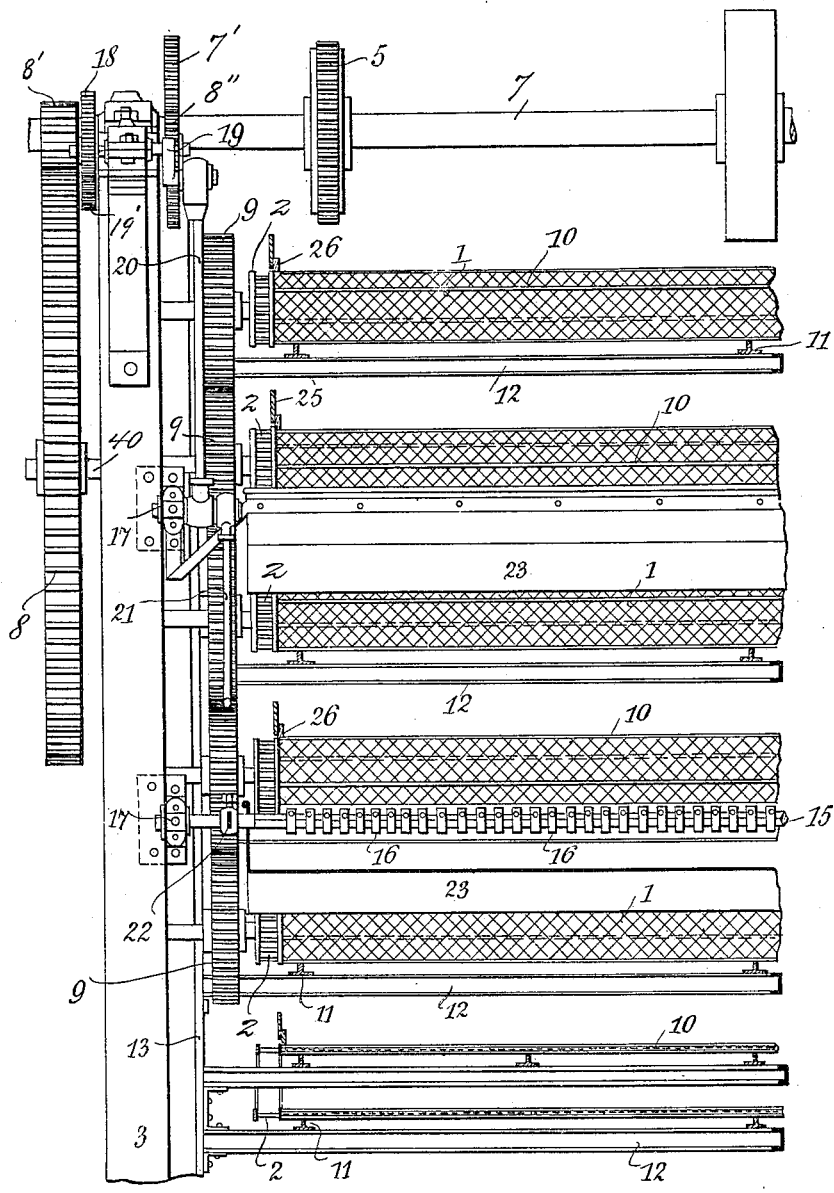

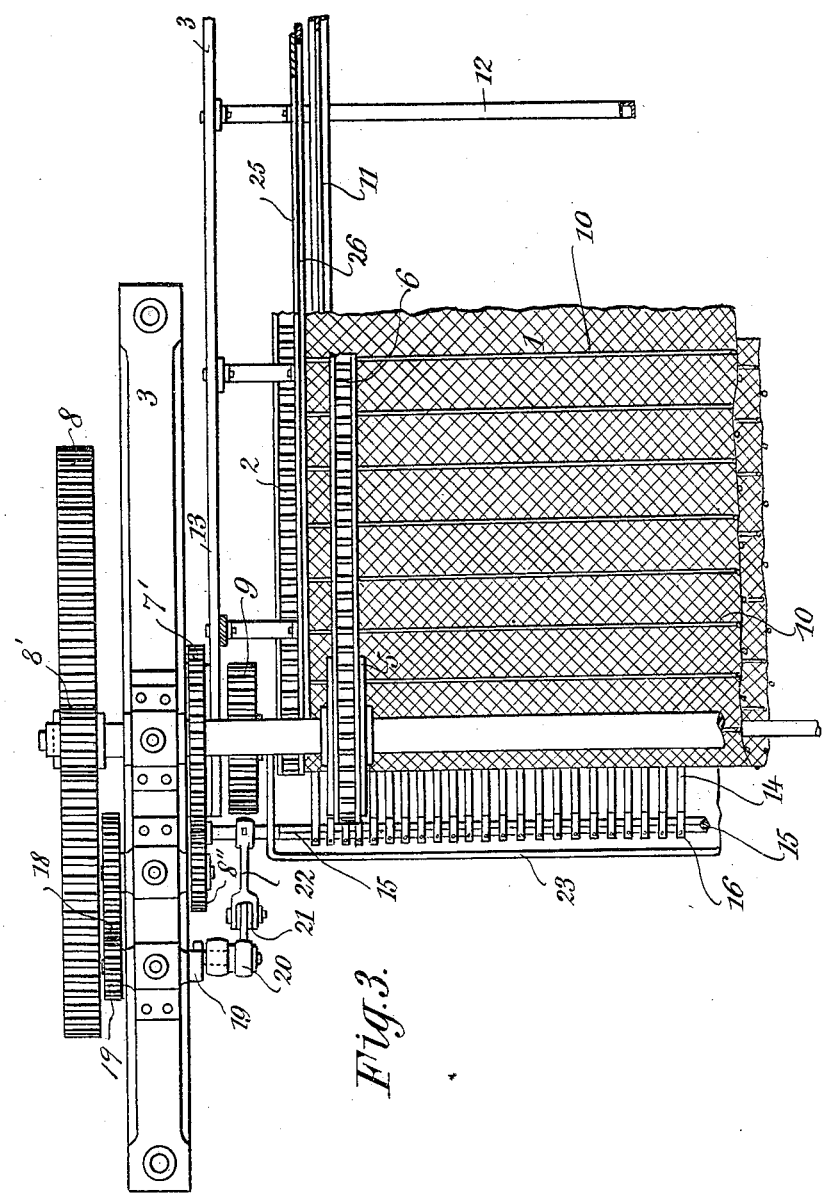

UNITED STATES PATENT OFFICE.

RICHARD PLISCHKE, OF VIENNA, AUSTRIA-HUNGARY.

MALT-GERMINATING APPARATUS.

No. 825,242.  Specification of Letters Patent.  Patented July 3, 1906.

Application filed August 15, 1904. Serial No. 220,817.

*To all whom it may concern:*

Be it known that I, RICHARD PLISCHKE, a subject of the Emperor of Austria-Hungary, residing at Vienna, in the Province of Lower Austria, Empire of Austria-Hungary, have invented certain new and useful Improvements in Malt-Germinating Apparatus, of which the following is a specification.

In the malting apparatus to which this invention pertains the malting has heretofore been carried out in a substantially closed housing, necessitating means to carry off the carbonic acid generated by germination and to prevent overheating of the grain.

One of the characteristic features of my invention lies in the general construction of the malting apparatus whereby the grain to be malted is practically exposed on all sides to the ambient air, the temperature of which in malt-houses is not liable to great variation, so that the carbonic-acid gas can freely escape into the ambient air, while excessive heating of the grain or malt is prevented, thus obviating the necessity of providing means for producing an artificial circulation of air.

A further characteristic feature of my invention resides in means for automatically and thoroughly turning and couching the grain while so exposed to the ambient air to effectually prevent the entangling or matting of the growing aerospire or root-fibrils, whereby a uniformly malted or matured and homogeneous product is obtained.

The invention furthermore embraces features of construction and combinations of cooperative elements whereby the desired results are obtained; but that my invention may be fully understood I will describe the same in detail, reference being had to the accompanying drawings, in which—

Figures 1, 2, and 3 show a part of the apparatus in longitudinal section, front elevation partly in section and parts broken away, and in plan, the driving and endless conveyer or propelling chains being shown diagrammatically.

The apparatus comprises a plurality of superposed endless carriers or hurdles 1, mounted in an open framing of suitable construction, so as to allow a perfectly-free circulation of the ambient air over substantially every part of said carriers, which are made of a suitable foraminous material, as wire-cloth of as coarse a mesh as is practicable to prevent the grain from passing through the meshes. These carriers 1 are provided on each edge with an endless link chain 2, mounted on sprocket-wheels 4, of which all but one are secured to shafts 4', which have their bearings in end standards 3 of the framing. A shaft 40 for one of the sprocket-wheels 4 is the power-transmitting shaft and carries a large gear 8, driven by a pinion 8' on the main driving-shaft 7, driven from any suitable prime motor, which shaft also carries a sprocket-wheel 5, driven by a chain 6. The main driving-shaft 7 also carries a gear-wheel 7', meshing with the transmitting-gear 8'', the shaft of which carries a gear-wheel 18, meshing with a pinion 19' on a crank-shaft 19 for purposes hereinafter described, said gearing being so proportioned as to impart a comparatively rapid rotation to said crank-shaft 19 for purposes presently explained.

The power-transmitting shaft 40 carries a gear-wheel 9, a similar gear-wheel being secured to each shaft 4', said gearing intermeshing in a well-known manner to transmit motion in opposite directions to successive carriers 1, as indicated by arrows, Fig. 1.

To uprights 13 of the framing of the apparatus are secured transverse supporting rails or girders 12, on which rest longitudinal inverted-T bars 11, over which the endless carriers 1 travel and by means of which they are prevented from sagging. These carriers are, furthermore, stiffened or braced by cross-rods 10, applied alternately to the outer and inner surfaces of the carriers and secured at either end to links of the traction or driving chains 2, as more clearly shown in Fig. 2.

To prevent grain from being spilled along the edges of the carriers 1 and to properly guide the grain from one carrier to the next carrier below, I provide guard-rails 25 at either edge of the carriers, extending from about the vertical diameter of the sprocket-wheels 4 at one end of the carrier to the like diameter of the companion sprocket-wheel at the opposite end of said carrier, as clearly shown in Fig. 1. These guard-rails 25 are conveniently secured to the uprights 13 and have secured to their lower edges a strip of flexible material 26, as rubber, felt, or leather, Figs. 2 and 3, which projects over the longitudinal edges of the carriers 1, so as to avoid too great wear of the latter.

The transfer of the grain from one carrier to another is effected through the following instrumentalities: At one end of each carrier is arranged a hopper 23, supported from the standards 3 and having side walls lapping over the guard-rails 25, and an inclined bottom arranged to deliver the grain to the carrier below or at a point intermediate the vertical and horizontal diametral lines of the sprocket-wheel 4. To prevent rapid wear of the foraminous carriers 1, I secure to the horizontal edge of the delivery end of each hopper a strip of flexible material 24, such as felt, rubber, or leather, and to prevent too rapid wear of this strip by contact with the stiffening-wires 10 on the outer face of the carrier I preferably pivot the hoppers to the standards 3 in such manner as to allow the delivery end thereof to swing upwardly to a sufficient extent to allow said rods or wires 10 to readily pass the strip 24.

As is well known, in malting the grain must be turned and loosened from time to time to prevent its matting by the intertwining or entangling of the root-fibrils during germination. This I effect mechanically as follows: In bearings 17 in the standards 3 are mounted cross-shafts 15, that pass through the hoppers 23, that portion of said shafts within the hoppers being preferably angular in cross-section, and on said shafts are mounted a number of arms 14, each having an eye 16, corresponding to the shape of the shaft. The free end of each arm is bent upwardly and so spaced as to allow the single grains to pass between them, said arms being adjustably secured on their shafts by means of set-screws, as clearly shown in Fig. 1. The shafts 15 are connected by radial arms 22 to an actuating-rod 21, which latter is connected to the crank of the crank-shaft 19 by a connecting-rod 20, whereby a rapid oscillation is imparted to the arms 14 below the carriers 1. In Fig. 1 the arms 14 are shown at the limit of their upward movement, and from said Fig. 1 it will be seen that the free end of the arms 14 projects some distance under the carriers 1 to effectually prevent any grain from falling from the upper faces of the carriers into the hopper 23 without being acted on by said arms, which thus vigorously shake the grain, disentangle the matted portions, and at the same time effectually expose the surfaces of the grain to the action of the ambient air. It will of course be understood that feed-hoppers and mechanism for shaking the grain are provided at each end of the carriers 1 and that said hoppers and shaking mechanism are located between the discharge end of one carrier and the feed end of the carrier next below, while mechanism for oscillating or rocking the shafts 15 may be or preferably is provided at each end of said shafts.

The operation of the apparatus, briefly stated, is as follows: The previously-steeped grain is fed from a suitable hopper (not shown) to the left-hand end of the upper carrier 1 while said carrier is in motion until a layer of grain has been distributed over the entire upper or carrying surface thereof, when the travel of the carrier is stopped for a certain period of time—in the case of barley, say, for twenty-four hours—the grain being thus exposed to the air in the malt-house. The carriers are then set in motion, the grain on the upper carrier being discharged from its right-hand end into a hopper 23 at that end and shaken up by the rapidly-rocking arms 14, dropping through the spaces between them into the delivery end of said hopper, and being lifted therefrom by the bracing or stiffening rods or wires 10 of the second carrier, fresh-steeped grain being simultaneously fed to the upper carrier. After the grain discharged from the upper carrier has been fed to the carrier next below and uniformly spread thereon and after the upper carrier has been supplied with a layer of steeped grain the travel of the carrier is again stopped for a definite period of time, these operations being repeated successively until the lowermost carrier has received a layer of grain. It is obvious that by regulating the periods of rest of the grain in accordance with the number of carriers, or vice versa, fully germinated or malted grain will leave the lowermost carrier. Inasmuch as the grain during the process of germination is at all times exposed to the ambient air and in view of its being thoroughly shaken and turned at predetermined periods, the carbonic-acid gas generated can escape freely and overheating of the grain is effectually prevented.

Having thus described my invention, what I claim as new therein, and desire to secure by Letters Patent, is—

1. Malting apparatus, comprising superposed foraminous endless carriers, means to move successive carriers in opposite directions, a feed-hopper at the discharge end of each carrier and a strip of flexible material projecting from the lower edge of the feed-hopper and contacting with a carrier below the level of the upper run of the carrier.

2. Malting apparatus, comprising superposed foraminous endless carriers, cross rods or wires applied to the upper and under surfaces of said carriers alternately, means to move successive carriers in opposite directions, at feed-hopper at the discharge end of each carrier and a strip of flexible material projecting from the lower edge of the feed-hopper and contacting with a carrier below the level of the upper run of the carrier.

3. Malting apparatus, comprising superposed foraminous endless carriers, cross rods or wires applied to the outer and inner surfaces of said carriers alternately, means to move successive carriers in opposite directions, a feed-hopper at the discharge end of each carrier to feed the discharged grain to the carrier immediately below and rocking or oscillating arms between the discharge end of the carrier and the feed end of the hopper, for the purpose set forth.

4. Malting apparatus, comprising superposed foraminous endless carriers, cross rods or wires applied to the outer and inner surfaces of said carriers alternately, means to move successive carriers in opposite directions, a feed-hopper at the discharge end of each carrier to feed the discharged grain to the carrier immediately below, and rocking or oscillating arms between the discharge end of the carrier and the feed end of the hopper, the free ends of said arms projecting under said carriers, for the purposes set forth.

5. Malting apparatus, comprising superposed foraminous endless carriers, cross rods or wires applied to the outer and inner surfaces of said carriers alternately, means to move successive carriers in opposite directions, a feed-hopper at the discharge end of each carrier to feed the discharged grain to the carrier immediately below, a rock-shaft extending through each hopper below the discharge end of a carrier, radial arms on said shafts projecting under the discharge ends of the carriers and means to impart to said shafts rapid rocking or oscillating movements, for the purposes set forth.

6. Malting apparatus, comprising superposed foraminous endless carriers, cross rods or wires applied to the outer and inner surfaces of said carriers alternately, means to move successive carriers in opposite directions, a feed-hopper at the discharge end of each carrier to feed the discharged grain to the carrier immediately below, a rock-shaft extending through each hopper below the discharge end of a carrier, radial arms adjustably secured on said shafts and projecting under the discharge ends of the carriers, and means to impart to said shafts rapid rocking or oscillating movements, for the purposes set forth.

7. Malting apparatus, comprising superposed foraminous endless carriers, cross rods or wires applied to the outer and inner faces of the carriers alternately, means to move successive carriers in opposite directions, a feed-hopper at the discharge end of each carrier, a flexible strip projecting from the lower edge of the hopper and contacting with the feed end of the next succeeding carrier, said hopper yieldingly supported, substantially as and for the purposes set forth.

8. The combination with the carriers 1, the feed-hoppers, the rock-shafts passing through said hoppers and the radial arms 14 on said shafts within the hoppers; of means to impart rapid short oscillations simultaneously to all said shafts, substantially as set forth.

In testimony whereof I have hereunto set my hand in presence of two subscribing witnesses.

RICHARD PLISCHKE.

Witnesses:
JOSEF RUBASCHE,
ALVESTO S. HOGUE.